United States Patent [19]

Hirano et al.

[11] Patent Number: 5,503,343
[45] Date of Patent: Apr. 2, 1996

[54] REVERSE ROTATION PREVENTIVE DEVICE FOR FISHING REEL

[75] Inventors: Kazuo Hirano; Eiji Shinohara, both of Tokyo, Japan

[73] Assignee: Daiwa Seiko, Inc., Tokyo, Japan

[21] Appl. No.: 158,298

[22] Filed: Nov. 29, 1993

[30] Foreign Application Priority Data

Nov. 30, 1992 [JP] Japan .................. 4-088161 U

[51] Int. Cl.⁶ ............................................. A01K 89/027
[52] U.S. Cl. .............................................................. 242/247
[58] Field of Search ............................ 242/297, 298, 242/299, 300, 247, 248; 188/82.3, 82.34, 265

[56] References Cited

U.S. PATENT DOCUMENTS

| | | | |
|---|---|---|---|
| 1,547,238 | 7/1925 | Russell et al. | 242/299 |
| 2,146,582 | 2/1939 | Kohlhepp | 242/268 |
| 3,612,437 | 10/1971 | Allebach | 242/268 |
| 4,087,058 | 5/1978 | Yamasaki et al. | 242/300 |
| 5,020,738 | 6/1991 | Yamaguchi | 242/247 |
| 5,370,330 | 12/1994 | Uehara et al. | 242/247 |
| 5,372,323 | 12/1994 | Hirano et al. | 242/299 |
| 5,374,001 | 12/1994 | Yamaguchi et al. | 242/247 |
| 5,379,959 | 1/1995 | Sato | 242/299 |

FOREIGN PATENT DOCUMENTS

64-38964  3/1989  Japan .

*Primary Examiner*—Katherine Matecki
*Attorney, Agent, or Firm*—Longacre & White

[57] ABSTRACT

An arrangement for a reverse rotation preventive device for a fishing reel. A hollow engagement member, which is a part of a rotor, is non-rotatively fitted on a drive shaft having an oblong cross-section. A bearing and a hollow collar are simply fitted on the drive shaft. The hollow collar and the hollow engagement member are formed with engagement portions through which they are non-rotatively coupled together. A one-way clutch is arranged so that an outer race member is fixed to a main body and a roller is located between the collar and the outer race member to provide a reverse rotation preventive function when the drive shaft is rotated reversely. By coupling the collar, which is formed into a simple configuration and contacts with the roller, to the engagement member non-rotatively fitted on the drive shaft, it is possible to maintain the dimensional accuracy and high-performance of the rolling-type one-way clutch utilizing wedge action.

14 Claims, 7 Drawing Sheets

REVERSE ROTATION PREVENTIVE DEVICE FOR FISHING REEL

BACKGROUND OF THE INVENTION

1. Field of the Invention

The present invention relates to a reverse rotation preventive device for a fishing reel, whereby the attempt reverse rotation of a drive shaft is inhibited using a rolling-type one-way clutch.

2. Description of the Prior Art

In order to reduce the play in the reverse rotation to prevent the failure of the hooking, it is known in the art to provide a rolling-type one-way clutch between a main body and a drive shaft used for winding a fishline to thereby stop the reverse rotation of the drive shaft, as disclosed, for instance, in Japanese Utility Model Kokai Publication No. Sho. 64-38964.

The rolling-type one-way clutch, however, requires hardness, strength and smoothness of an inner member since local retaining force and impact load both act onto a rolling member and the inner member which is disposed inside the rolling member due to the wedge action when the clutch is operated in the reversed state.

If the rolling-type one-way clutch is provided between the reel main body and the fishline-winding drive shaft as in Japanese Publication no. 64-38964 (in this case the drive shaft corresponds to the inner member), the outer periphery of the drive shaft is likely to be damaged or deformed to make it difficult to maintain the high performance of the one-way clutch which allows little idle rotation in the reverse state due to the wedge action.

If an additional inner member having the sufficient hardness and strength is provided on the outer periphery of the drive shaft, it is necessary to provide the inner member onto the drive shaft non-rotatively. Generally, the outer periphery of the drive shaft is formed into an oblong shape in cross-section since another member must be non-rotatively fitted to the outer periphery of the drive shaft (for instance, in a pinion shaft of the spinning reel, a rotor must be fitted thereto). Therefore, forming the rotation-preventive hole having the oblong cross-section in the inner member which necessarily has the length corresponding to the length of the rolling member, results in the increase of the cost. Further, contrary to the necessity of grinding the inner and outer circumferential surfaces of the additional inner member, the oblong shaped hole cannot be subjected to the grinding process.

SUMMARY OF THE INVENTION

Accordingly, a primary objective of the present invention is to provide an improved arrangement of a reverse rotation preventive device for a fishing reel, which is free from the damage and deformation of a drive shaft due to the wedge action by providing a hollow inner member between a rolling member and the drive shaft. The structural arrangement of the invention can maintain the high performance of an incorporated rolling-type one-way clutch owing to the wedge action thereof, and which can non-rotatively retain the hollow inner member onto the drive shaft although the inner member is made simple in construction to enable the grinding process on both sides of the member.

In order to attain the above-noted and other objectives, the present invention provides a reverse rotation preventive device for a fishing reel, which prevents a reverse rotation of a drive shaft provided in a fishline taking-Up mechanism taking up a fishline onto a spool. The device includes: a rolling type one-way clutch including an outer race member adapted to be non-rotatably arranged on a reel main body, and a rolling member; an engagement member non-rotatably mounted on the drive shaft, the engagement member having a first engagement portion; a hollow collar fitted on the drive shaft so as to contact with and be engageable with the rolling member; whereby the hollow collar has a second engagement portion engaged with the first engagement portion so as to prevent the hollow collar from rotating relative to the engagement member.

The hollow collar is formed with a completely circular through-hole by which the hollow collar is fitted on the drive shaft. Preferably, the hollow collar includes a first part the outer circumference of which is contactable with the rolling member, and a second part the outer circumference of which is prevented from contacting with the rolling member so that the second engagement portion is formed in the second part.

DETAILED DESCRIPTION OF THE PREFERRED EMBODIMENTS

Preferred embodiments of the present invention will now be described in detail with reference to the drawings attached hereto.

FIGS. 1 to 6 show a first embodiment of the present invention.

Figure 1:
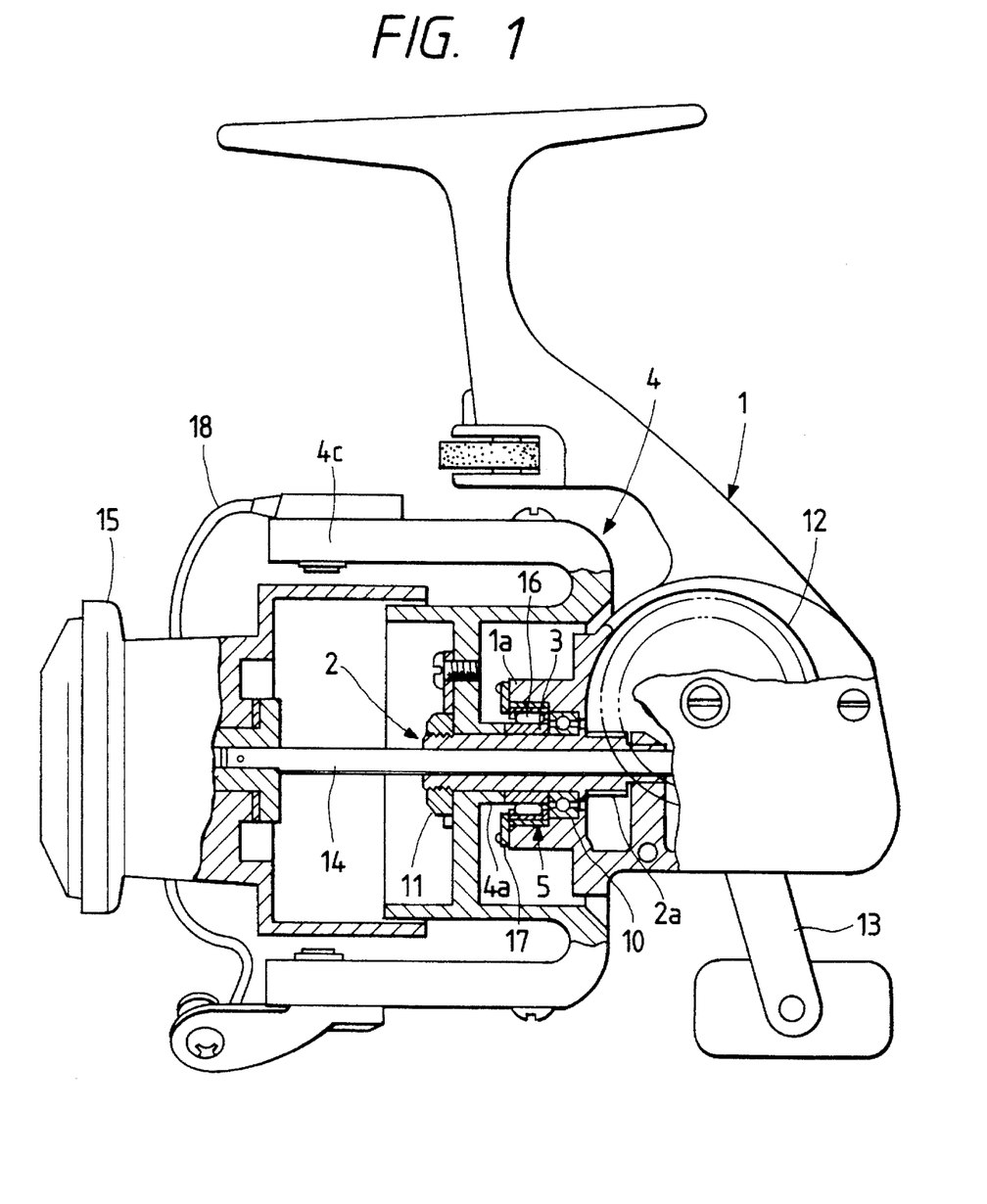
FIG. 1 is a sectional side view showing major parts of a spinning reel to which a reverse rotation preventive device according to a first embodiment is applied.
Figure 2:
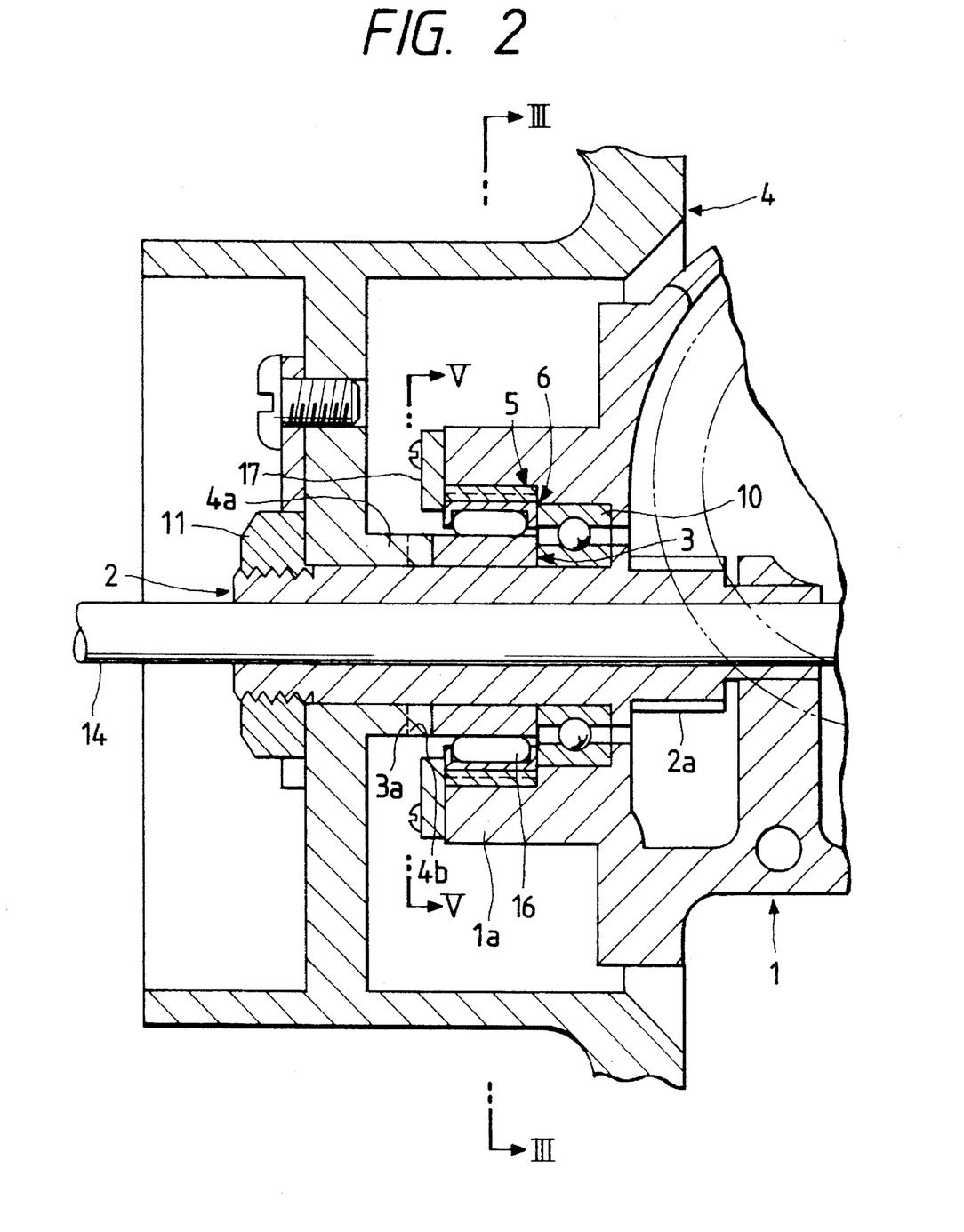
FIG. 2 is an enlarged sectional side view showing the major parts of the fishing reel shown in FIG. 1.

As shown in FIGS. 1 and 2, in a spinning reel for fishing, a bearing 10 for rotatably supporting a hollow drive shaft 2 is fitted on an outer periphery of the spool shaft 14 and is located at a front recess portion 1a of a reel main body 1. A hollow collar 3 is fitted on the outer periphery of the hollow drive shaft 2 in front of the bearing 10 toward a spool 15. A hollow engagement member 4a formed as a part of a rotor 4 is non-rotatively fitted on the spool shaft 14 in front of the hollow collar 3. The bearing 10, the hollow collar 3 and the engagement member 4a are retained in place by means of a nut 11 threadingly engaged with the drive shaft 10.

The rotor 4 is supported so as to rotate in conjunction with the rotation of the handle 13 through a drive gear 12 meshed with a pinion 2a provided on the hollow drive shaft 2. The spool 15 is supported on a distal end of a spool shaft 14 passing through and projecting from the drive shaft 2 so as to reciprocate back and forth in conjunction with the rotation of the handle 13. A rolling type one-way clutch 5 includes a roller type rolling member 16 which is placed on an outer periphery of the hollow collar 3 within the front recess 1a of the reel main body 1. The bearing 10 and the rolling-type one-way clutch 5 are prevented from moving out of place by a withdrawal preventive plate 17.

As shown in FIGS. 3 to 6, the outer periphery of the hollow drive shaft 2 is formed into an oblong shape in cross-section, that is, made up two planar portions 2b and two circular portions 2c. The hollow engagement member 4a formed as a part of the rotor 4 is non-rotatively coupled thereto by means of the planer portions 2b since the hollow engagement member 4a is formed with an oblong through-hole. To the contrary, each of inner and outer surfaces of the hollow collar 3 is formed in circle cross-section. The hollow collar 3 is formed at its one end with a projection-like engagement portion 3a (FIG. 6) whereas the engagement member 4a of the rotor 4 is formed at its one end with a groove-like engagement portion 4b for receiving the engagement portion 3a of the hollow collar 3 to prevent the relative rotation therebetween. In addition, a pair of support arms 4c project from a rear portion of the outer periphery of the rotor 4, and a bail arm 18 is swingably supported on the support arms 4c.

Figure 3:
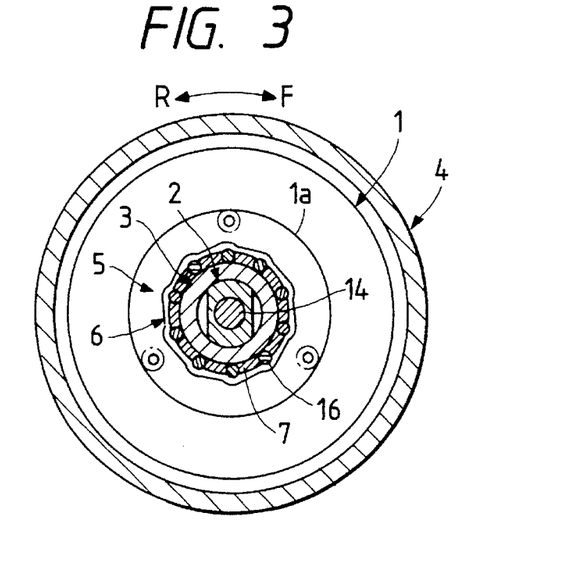
FIG. 3 is a sectional front view taken along line III—III of FIG. 2, showing a hollow portion of a rear of a rotor and a one-way clutch.
Figure 4:
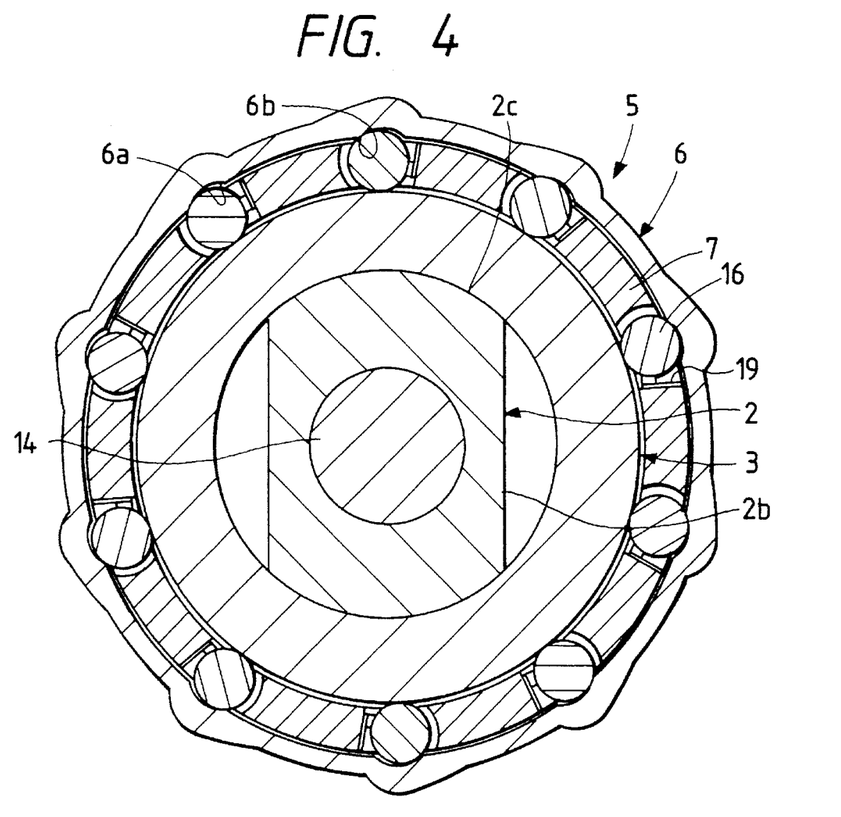
FIG. 4 is an enlarged sectional front view of the one-way clutch shown in FIG. 3.
Figure 5:
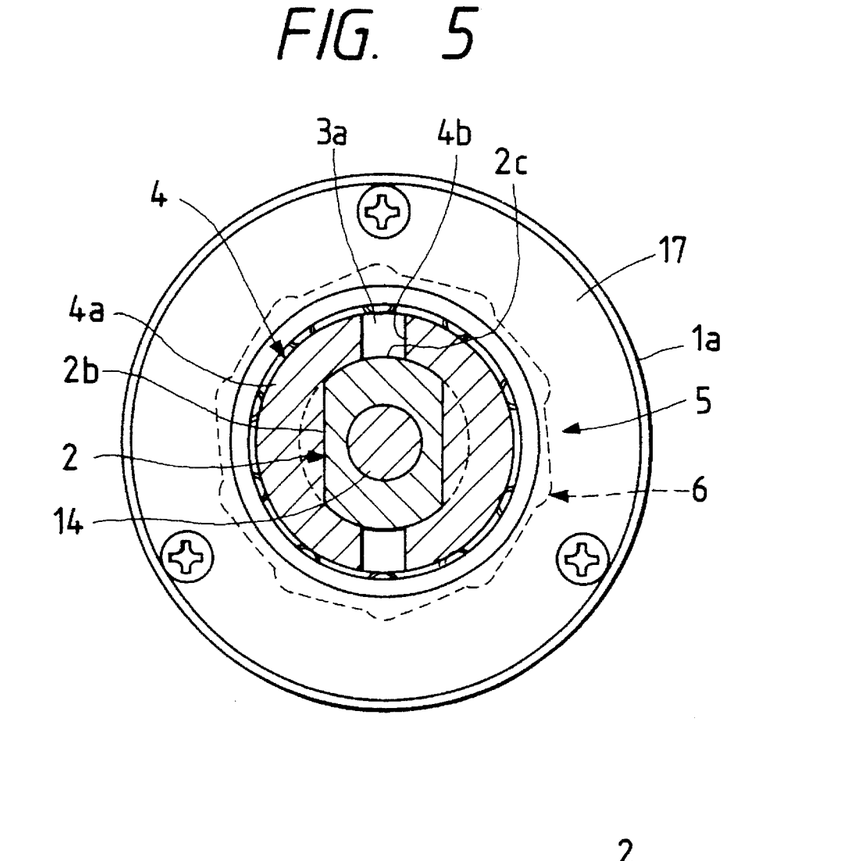
FIG. 5 is a sectional front view taken along line V—V of FIG. 2.
Figure 6:
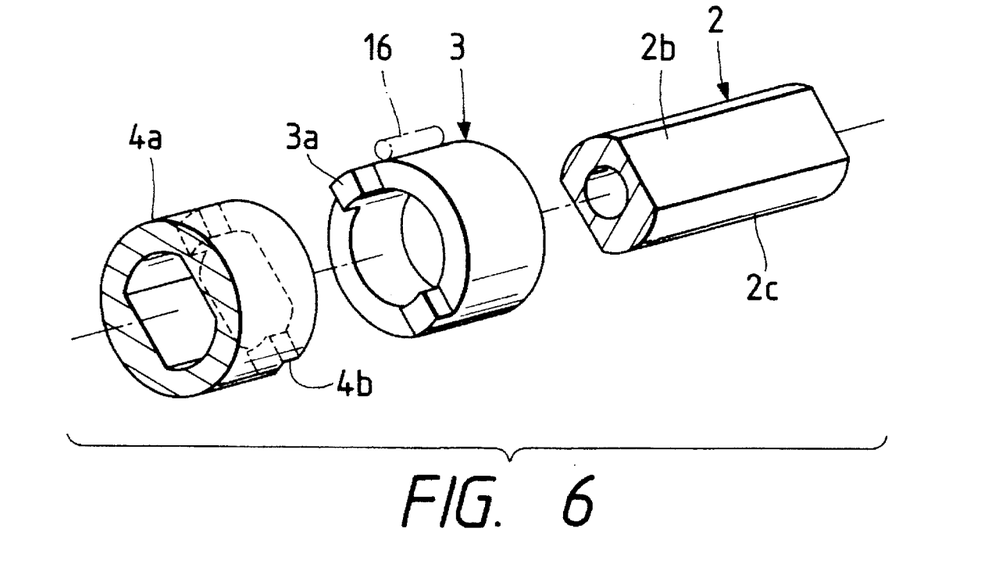
FIG. 6 is an exploded perspective view showing a drive shaft, an engagement member and a hollow collar of the first embodiment.

As shown in FIGS. 2 to 4, the rolling type one-way clutch 5 includes a plurality of roller or needle type rolling members 16 placed on the outer circumference of the hollow collar 3. The clutch 5 further includes an outer race member 6, a retainer 7 and a spring 19. Each of the roller type rolling members 16 is inserted into respective one of a plurality of through-holes of the retainer 7 and held thereby, and further is depressingly biased by the spring 19. The inner circumference of the outer race member 6 defines, for each roller 16, a free rotation area 6a wherein the roller 16 is freely rotatable, and a rotation hindrance area wherein the roller 16 is prevented from rotating by tightly contacting a rotation hinderance surface 6b of the inner circumference of the outer race member 6.

The operation of the reverse rotation preventive device thus constructed is described below:

When the handle 13 is rotated forwardly to wind a not-shown fishline onto the spool 15, the drive shaft 2, rotor 4 and hollow collar 3 are rotated forwardly, i.e. clockwise in FIG. 3. If the hollow collar 3 is rotated forwardly, then the roller type rolling member 16 of the one-way clutch 5 is located within the free rotation area 6a defined by the outer race member 6 to permit the rotation of the rotor 4 in the clockwise direction as shown in FIG. 4.

When the fishline is fed due to pulling force of hooked fish to rotate the rotor 4 reversely, the drive shaft 2, rotor 4, engagement member 4a and hollow collar 3 is rotated reversely. At the same time, the attempted reverse rotation of the hollow collar 3 causes the roller-type rolling member 3 of the one-way clutch 5 to be moved from the free rotation area 6a to the rotation hinderance area and brought into contact with the rotation hinderance surface 6b, whereby the reverse rotation of the hollow collar 3 relative to the outer race member 6 is inhibited due to the wedge action of the roller-type rolling member 16. Thus, the reverse rotation of the rotor 4 is stopped. Since the roller-type rolling member 16 can produce the wedge action immediately with little idle rotation, the reverse rotation of the rotor 4 can be immediately and rapidly stopped.

In a reverse rotation preventive device for a fishing reel as mentioned above, a bearing 10 for rotatably supporting a drive shaft and a hollow collar 3 are both fitted onto a drive shaft 2 between a pinion 2a and a rotor 4 and within a front portion 1a of a reel main body 1. The hollow collar 3 rotates together with the drive shaft by means of an engagement portion 4a and contacts with a rolling member 16 of the one-way clutch. That is to say, the drive shaft 2 and the hollow collar 3 are coupled to each other in such a manner that the circular inner circumference of the hollow collar 3 is fitted on the oblong-shaped outer circumference of the drive shaft 2. Accordingly, even if the roller type rolling member 16 of the one-way clutch 5 applies the impact load onto the hollow collar 3 in the reversed state where the attempt reverse rotation of the rotor 4 is stopped, the impact is not directly transmitted to a portion between the corner of the planer portion 2b of the oblong drive shaft 2 and the inner circumference of the circular hollow collar 3. Thus, it is possible to maintain the high-performance and the dimensional accuracy of the rolling-type one-way clutch 5.

Further, the hollow collar 3 is generally required to have sufficient hardness and strength as mentioned above, but since the hollow collar 3 of the present invention has such a simple configuration that it is formed into a hollow and it only has projection-like engagement portion 3a at one axial end thereof, the machining is easy and it can be made with high precision. The resultant collar 3 is superior in durability and anti-flaw property, to thereby make it possible to maintain the strength and performance of the one-way clutch 5 while making the entire construction small in size.

Figure 7:
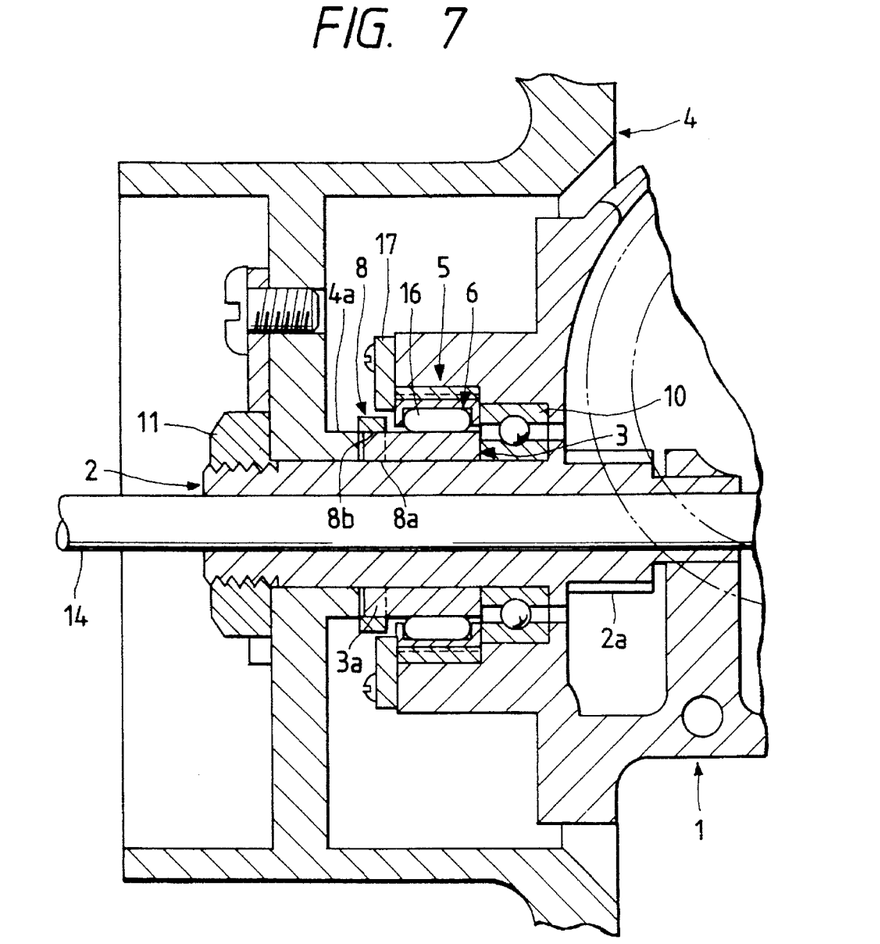
FIG. 7 is an enlarged sectional side view showing major parts of a spinning reel to which a reverse rotation preventive device of a second embodiment of the present invention is applied.
Figure 8:
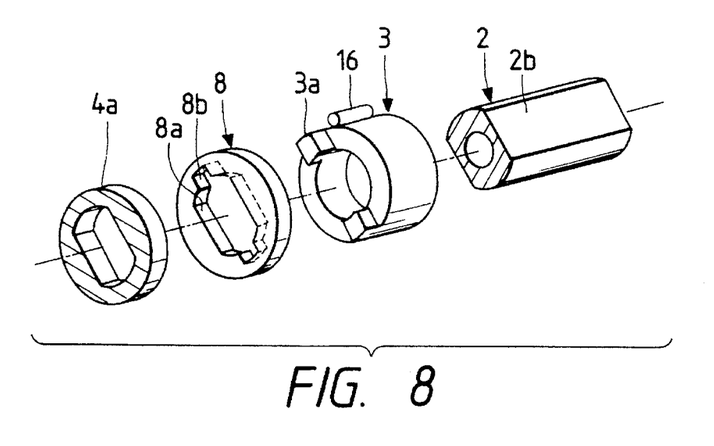
FIG. 8 is an exploded perspective view showing a drive shaft, a hollow portion of a rotor, an engagement member and a hollow collar of the second embodiment.

FIGS. 7 and 8 show a second embodiment of the present invention. In the second embodiment, a washer-like engagement member 8 having an oblong through-hole 8a is non-rotatively fitted on the outer circumference of the hollow drive shaft 2. The engagement member 8 is formed with a recess-like engagement portion 8b with which an engagement portion 3a of a hollow collar 3 fitted on the outer circumference of the drive shaft 2 is engaged to prevent relative rotation therebetween. The collar 3 is the same type as that of the first embodiment. A roller-type rolling member 16 of a one-way clutch 5 is placed on the outer circumference of the hollow collar 3 as in the first embodiment. Due to the provision of the washer-like engagement member 8, the hollow portion 4a of the rotor 4 does not have the engagement portion as opposed to the first embodiment. Other parts of the second embodiment are substantially the same as those of the first embodiment.

Figure 9:
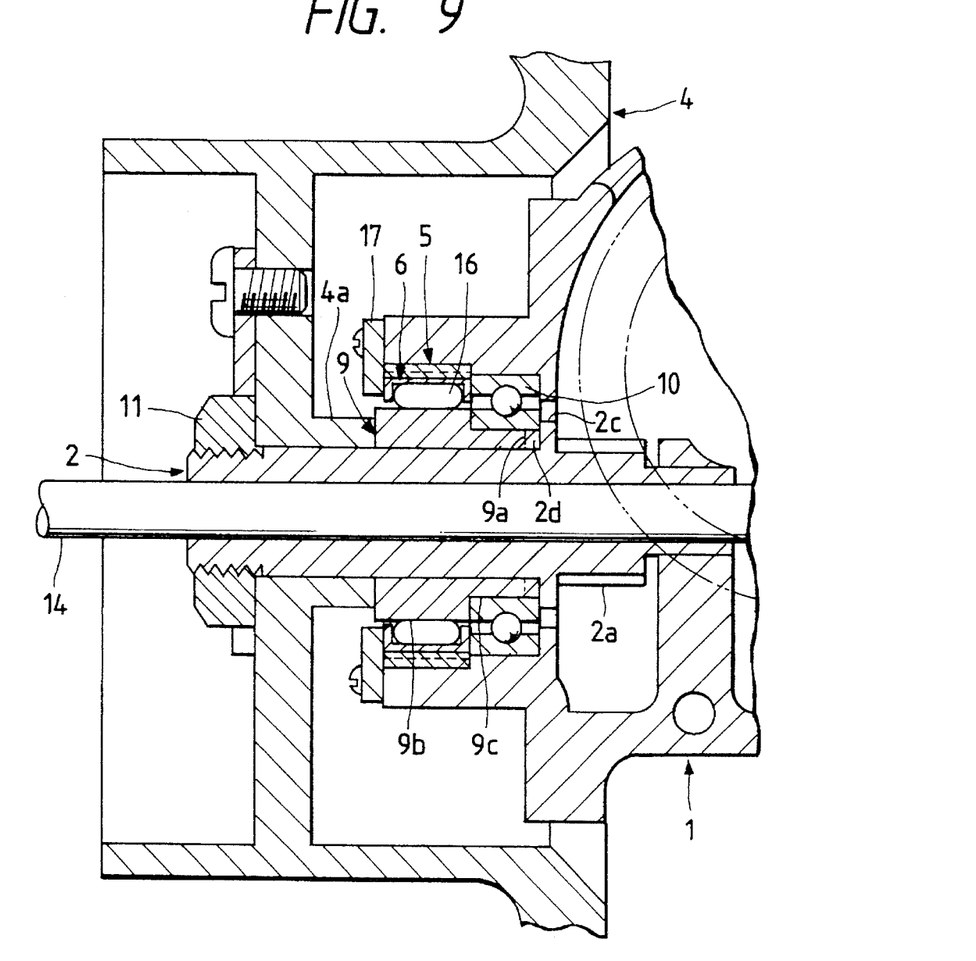
FIG. 9 is an enlarged sectional side view showing major parts of a spinning reel to which a reverse rotation preventive device of a third embodiment of the present invention is applied.
Figure 10:
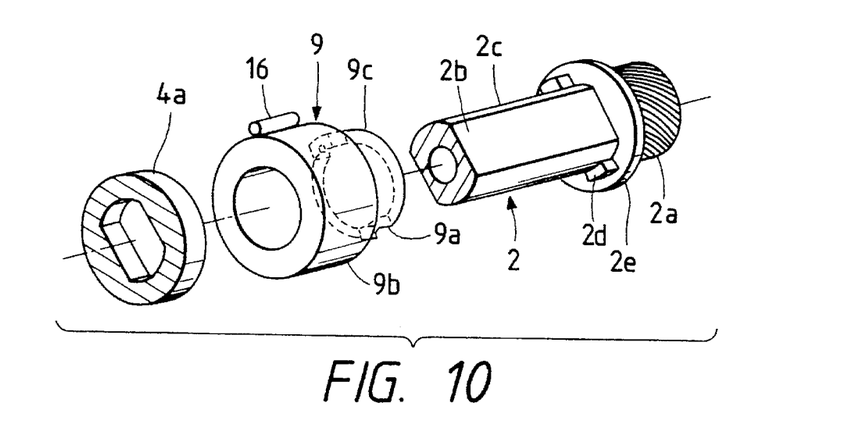
FIG. 10 is an exploded perspective view showing a drive shaft, a hollow portion of a rotor, an engagement member and a hollow collar of the third embodiment.

FIGS. 9 and 10 show a third embodiment of the present invention. In the third embodiment, a hollow drive shaft 2 includes, on the outer periphery thereof, a pinion 2a, planer and semi-circular portions 2b, 2c, a projection-like engagement portion 2d and a flange 2e, The projection-like engagement member 2d is non-rotatively engaged with the groove-like engagement member 9a of the hollow collar 9. The hollow collar 9 of this embodiment has a large diameter portion 9b and a small diameter portion 9c, the outer circumference of each being circular. The roller-type rolling member 16 of the one-way clutch 5 is placed on the outer circumference of the large diameter portion 9b. The bearing 10 is fitted on the outer circumference of the small diameter portion 9c. Other parts of the third embodiment are substantially the same as those of the first embodiment.

Figure 11:
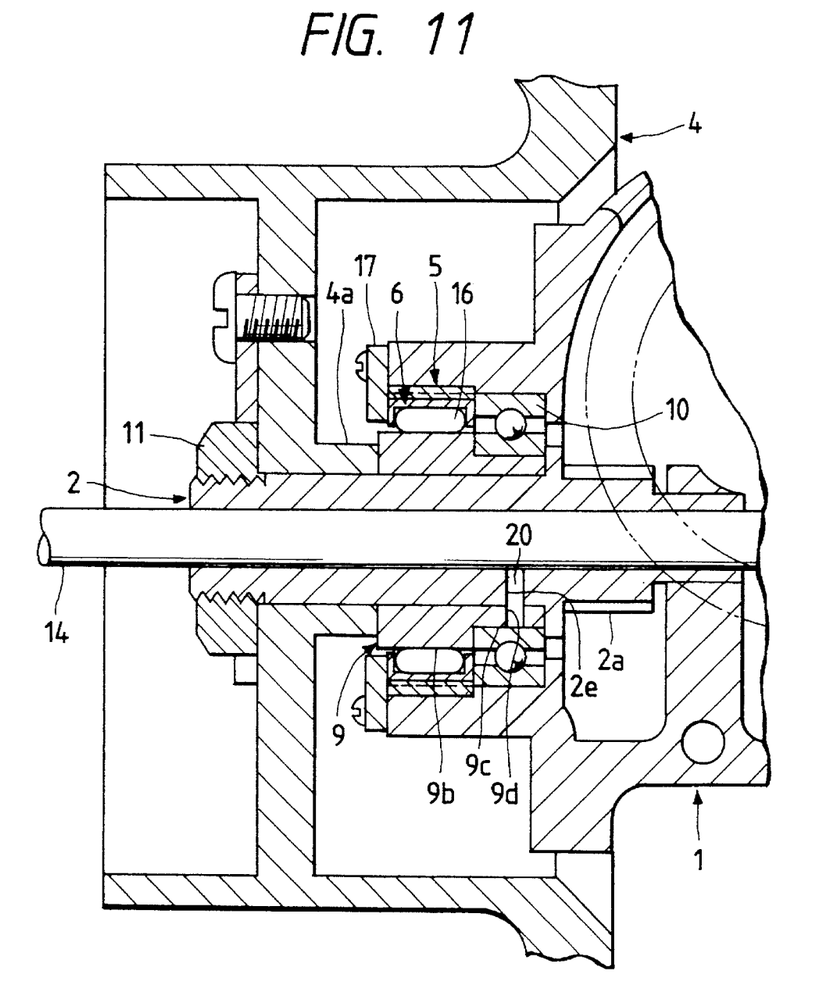
FIG. 11 is an enlarged sectional side view showing major parts of a spinning reel to which a reverse rotation preventive device according to a fourth embodiment of the present invention is applied.
Figure 12:
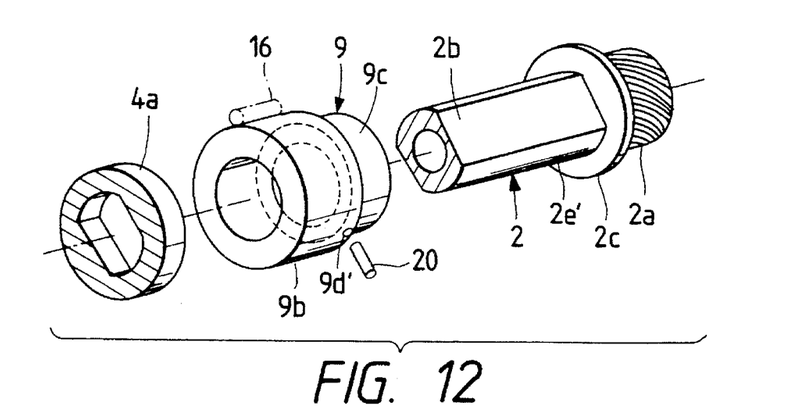
FIG. 12 is an exploded perspective view showing a drive shaft, a hollow portion of a rotor, and a hollow collar of the fourth embodiment.

FIGS. 11 and 12 show a fourth embodiment. In the fourth embodiment, the hollow collar 9 of the same type as that of the third embodiment has a modified engagement portion 9d' in the form of a through-hole in place of the groove-like engagement portion. The collar 9 is fitted on the outer periphery of the hollow drive shaft 2. The drive shaft 2 of this embodiment is similar to that of the third embodiment, but the drive shaft 2 has the engagement portion 2e' in the form of a blind hole in place of projection-like engagement portion. The drive shaft 2 and the hollow collar 9 are non-rotatively fitted together by means of an engagement member 20 in the form of a pin which is inserted into the engagement portions 2e' and 9d'. The roller-type rolling member 16 of the one-way clutch 5 is placed on the outer circumference of the hollow collar 9. Other constructions is substantially the same as that of the first embodiment.

Although the first embodiment of the present invention is described in case where the groove-like engagement portion 4b is formed on one end of the engagement member 4a of the rotor 4 whereas the projection-like engagement portion 3a is formed on the mating end of the hollow collar 3, the engagement member 4a may have a projection-like engagement portion 4b whereas the hollow collar 3 may have a groove-like engagement portion 3a. Similar alternative arrangement can be made on the engagement member 8 and the hollow collar 3 of the second embodiment and the drive shaft 2 and the hollow collar 9 of the third embodiment.

According to the present invention, since the drive shaft and the hollow collar are coupled to each other in such a manner that the circular inner circumference of the hollow collar is fitted on the oblong outer circumference of the drive shaft, the corner portion of the oblong drive shaft and the inner circumference of the hollow collar can be protected from the impact occurring when the attempt reverse rotation is stopped by the virtue of the wedge action of the rolling-type one-way clutch. Thus, it is possible to maintain the dimensional accuracy and the desired high-performance of the rolling-type one-way clutch.

Further, the hollow collar is generally required to have sufficient hardness and strength as mentioned above, but since the hollow collar of the present invention has such a simple configuration that it is formed into a hollow and it only has projection-like engagement portion at one axial end thereof, the machining is easy and it can be made with high precision. Thus the prevent invention can provide a reverse rotation preventive device for a fishing reel, which is superior in durability and anti-flaw property.

What is claimed is:

1. A reverse rotation preventive device for a fishing reel, which prevents a reverse rotation of a drive shaft provided in a fishline taking-up mechanism taking up a fishline onto a spool, said device comprising:

a rolling type one-way clutch including an outer race member non-rotatably arranged on a reel main body, and a rolling member;

a hollow engagement member substantially coaxially and non-rotatably mounted on said drive shaft, said engagement member having a first engagement portion;

a hollow collar fitted on said drive shaft so as to contact with and be engageable with said rolling member; said hollow collar having a second engagement portion engaged with said first engagement portion so as to prevent said hollow collar from rotating relative to said engagement member;

and means for fixing said first and second engagement portions against movement with respect to said drive shaft in an axial direction of said drive shaft.

2. The device according to claim 1, wherein said hollow collar is formed with a completely circular through-hole by which said hollow collar is fitted on said drive shaft.

3. The device according to claim 2, wherein said hollow collar includes a first part, the outer circumference of which contacts with said rolling member, and a second part the outer circumference of which is offset from said rolling member in said axial direction, said second engagement portion is formed in said second part.

4. The device according to claim 2, wherein said drive shaft has an outer circumference made by a planar portion and a rounded portion.

5. The device according to claim 2, wherein said drive shaft has a pinion meshed with a drive wheel rotated in conjunction with a handle rotation, and said engagement member comprises an integral portion of a rotor provided in a spinning reel.

6. The device according to claim 1, wherein said engagement member and said hollow collar comprise integral parts of said engagement member and said hollow collar, respectively.

7. The device according to claim 1, wherein said first and second engagement portions are formed as a projection and recess extending in said axial direction of said drive shaft, said projection being formed on one of said engagement member and said hollow collar and said recess being formed on the other of said engagement member and said hollow collar.

8. A reverse rotation preventive device for a fishing reel, which prevents a reverse rotation of a drive shaft provided in a fishline taking-up mechanism taking up a fishline onto a spool, said drive shaft defining an axial direction, said device comprising:

a rolling type one-way clutch including an outer race member non-rotatably arranged on a reel main body, and a rolling member;

a hollow engagement member substantially coaxially and non-rotatably mounted on said drive shaft, said engagement member having a first engagement portion;

a hollow collar fitted on said drive shaft so as to contact with and be engageable with said rolling member; said hollow collar having a second engagement portion engaged with said first engagement portion so as to prevent said hollow collar from rotating relative to said engagement member;

wherein said engagement member and said hollow collar are slidable onto said drive shaft in said axial direction.

9. The device according to claim 8, further comprising means for fixing said engagement member and said hollow collar with respect to each other in said axial direction.

10. The device according to claim 8, wherein said engagement member comprises an integral part of a rotor provided in a fishing reel.

11. The device according to claim 8, further comprising a retaining means for retaining said engagement member and said hollow collar on said drive shaft.

12. The device according to claim 11, wherein said retaining means comprises a screw threadingly disposed on said drive shaft.

13. The device according to claim 8, wherein said first and second engagement portions comprise integral parts of said engagement member and said hollow collar, respectively.

14. The device according to claim 8, wherein said first and engagement portions are formed as a projection and recess extending in said axial direction of said drive shaft, said projection being formed on one of said engagement member and said hollow collar and said recess being formed on the other of said engagement member and said hollow collar.

* * * * *